May 22, 1956  W. H. SMITH  2,746,623
VEHICLE MOUNTED SHOVEL LOADER
Filed March 31, 1952  3 Sheets-Sheet 1
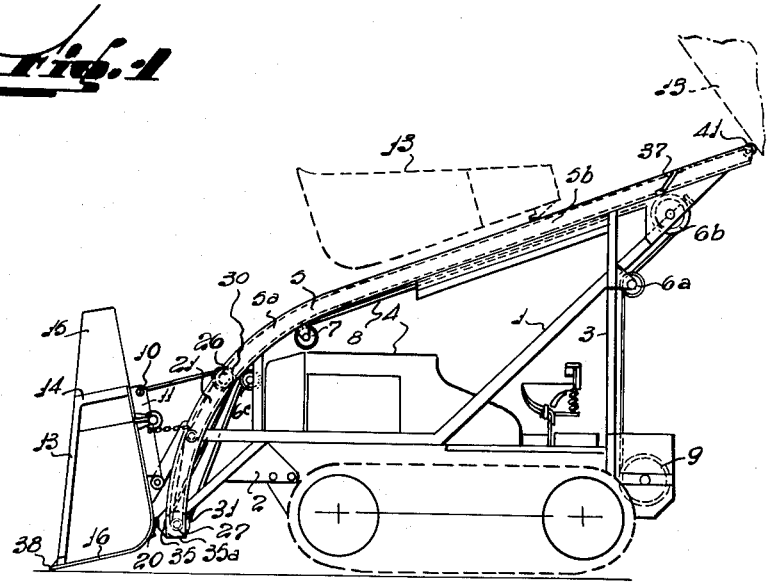
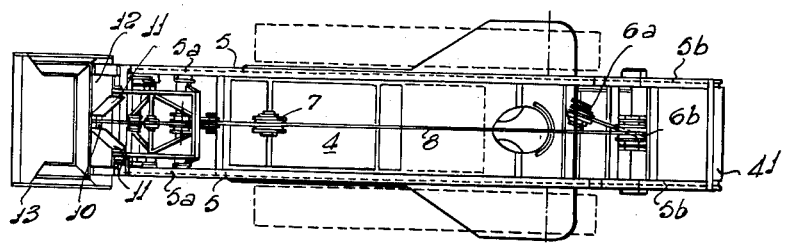
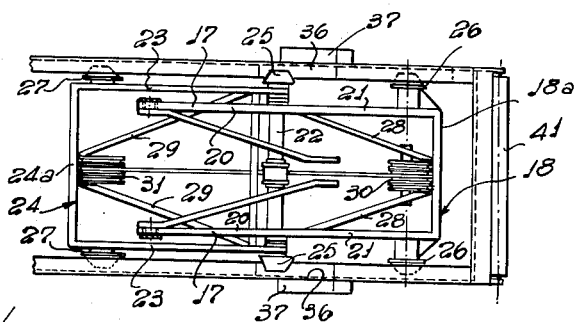
INVENTOR
William Hay Smith
BY
Attorney

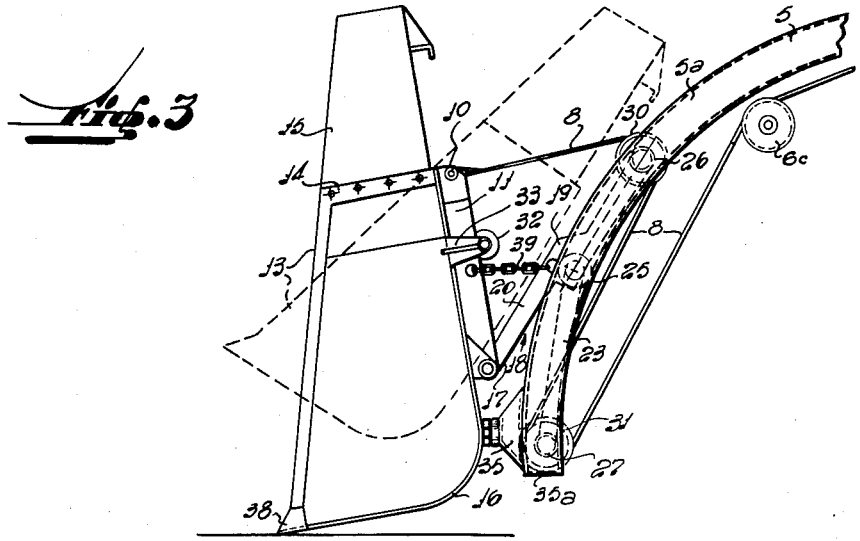
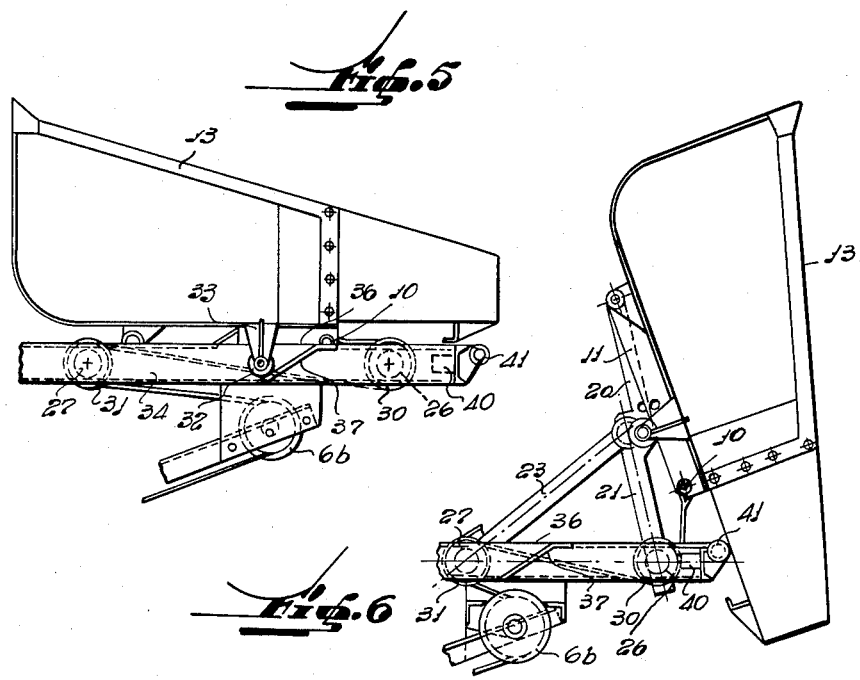

INVENTOR
William Hay Smith
BY Attorney

United States Patent Office 2,746,623
Patented May 22, 1956

2,746,623
VEHICLE MOUNTED SHOVEL LOADER

William Hay Smith, Buenos Aires, Argentina

Application March 31, 1952, Serial No. 279,593

6 Claims. (Cl. 214—103)

This invention relates to load lifting apparatus used for hoisting materials such as sand, gravel, debris, earth or for agricultural purposes such as lifting bales of hay or cereal bags. The main object being that of providing an improved load lifting apparatus which will be easy to operate and is readily applicable to vehicles, for example, those of the tractor or truck type.

The known load lifting arrangements have the bucket or loading receptacle mounted at one end of the vehicle, generally the forward end, so that once a load has been hoisted from a pile of material, the material cannot be unloaded until after the direction of the apparatus has been changed. Consequently, the known load lifting requires a relatively large operating ground and consumes a lot of time and fuel, as well as being subject to substantial wear and tear. When the material to be transported is located at the back of an alley wherein the vehicle can only run in a straight line, the use of an ordinary front end loader becomes so expensive that it is generally necessary to resort to other means for hoisting the material.

In accordance with this invention, all of the above drawbacks are overcome and several additional advantages are obtained with the aid of an improved load lifting apparatus applicable to vehicles, which comprises a frame including channel members defining a track, a collapsible carriage, a bucket pivoted to said carriage, and releasable means mechanically associated with said carriage for preventing collapse thereof whilst the carriage is travelling over a major portion of said track, and means for neutralizing said releasable means to permit said carriage to collapse. The carriage is adapted to be moved over the track by means of a cable and a cable take up means to which end suitable pulley means are provided in the structure.

In order that the invention may be more clearly understood and readily carried out, certain preferred embodiments thereof have been illustrated by way of example in the accompanying drawings, in which:

Fig. 1 is a side view of a vehicle equipped with a load lifting apparatus in accordance with this invention.

Fig. 2 is a plan view of the vehicle shown in Fig. 1.

Fig. 3 is a side view of a receptacle with its carriage located at the lower end of the rails.

Fig. 4 is a plan view of the carriage in position near the higher end of the rails.

Fig. 5 is a side view of the receptacle and carriage assembly, positioned near the higher end of the rails; and Fig. 6 is a side view of the receptacle and carriage assembly after the receptacle has been tilted.

Figure 7:
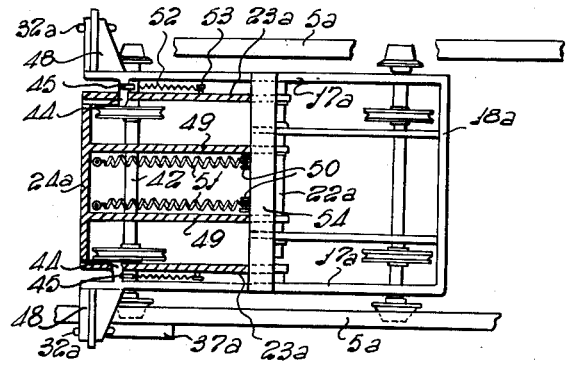
Fig. 7 is a plan view of the carriage in position near the higher end of the rails illustrating a modification of the construction shown in Figure 4.

With reference to the drawings, the novel load lifting apparatus as shown comprises a frame designated with the reference numeral 1, which may be of any suitable construction and will include means such as plates 2 and an upright 3 for allowing the fixed or pivoted mounting thereof to a vehicle 4 (shown as a caterpillar tractor) at the mounting points generally provided in the frames of tractors or other suitable vehicles.

The frame 1 is lower at the end corresponding to the forward part of the vehicle than at the rear end and carries a pair of channel members 5 having a front portion 5a which may be straight but which in the embodiment shown is curved downwardly, and a straight and upwardly inclined major portion 5b. These rails are mounted in a spaced relationship, with the flanges thereof directed inwardly and form a track having a low shovelling end and a high tipping end.

On the frame 1 and also between the channel members 5 there are arranged a plurality of pulleys 6a, 6b, 6c (on the frame) and 7 (between the channel members) for guiding a cable 8 one end of which is secured to a winding device 9, of any suitable type, mounted on the frame 1 or on the frame of the vehicle 4, as desired.

The other end of the cable 8 is secured to a pin 10 (see Fig. 2) supported between a pair of plates 11 firmly secured to the bottom 12 of a receptacle which has been illustrated as a bucket 13, with the pin 10 located on the central line and near the discharge end 14 of the receptacle. At this end, the receptacle 13 is provided with a guide chute 15. When it is desired to use the structure for laying or stacking, the receptacle may take the shape of a platform or in the case of manure or root crops the receptacle may be a fork bucket.

The spacing of the plates 11 is gradually increased as they extend towards the loading end 16 of the receptacle, but in the embodiment shown they terminate short of the curved bottom portion. To these ends of the plates are pivoted the free ends of two parallel spaced side members 17 of a U leading section 18, forming part of a collapsible carriage, said side members 17 having a stepped shape, as shown in the drawings, so that the central portion 19 is wider than the arms 20, 21 extending in opposite directions and at different levels therefrom.

The central portions 19 of both side members 17 are crossed by an axle 22 (see Fig. 4) adapted to have pivoted thereto the free ends of two side arms 23 of a trailing portion 24 also forming part of said collapsible carriage, said axle projecting beyond said ends so as to receive rollers 25.

Flanged wheels 26 are mounted on side members 17 near the cross member 18a of leading section 18. Similarly, the trailing section 24 is provided near the cross member 24a thereof with a pair of flanged wheels 27.

Guide pulleys 30, 31 for the cable 8 are mounted between respective pairs of inclined braces 28, 29 of the leading section 18 and the trailing section 24, thus completing the receptacle carriage. The receptacle 13 carries also a pair of outer rollers 32 supported by means of brackets 33 at a level corresponding approximately to the lower wing of the channel members and spaced apart by a distance allowing them to be positioned near the outer face 34 of the channel members.

After being passed about the pulley 6a, and the pulley 6b located near the higher end of the channel members 5, the cable 8 is passed around the pulley 7 mounted between the rails and pulley 6c on the frame 1, the last-named two pulleys serving to support the cable during the portion of the travel of the receptacle from the loading position to about one third of its entire travel, as will be seen hereinafter.

The cable 8 is then passed around the guide pulley 31 on trailing section 24 and finally about the guide pulley 30 on leading section 18 before terminating in the pin 10.

The lower shovelling ends of channel members 5 are provided with stops 35 which may be adjustable and serve as a bearing for the bottom of the receptacle 13 in its loading position, having also block means 35a for stopping the wheels 27. When the structure is to be used with a tilting bucket, the wing of each channel member will be cut away for a suitable distance at a point near the higher or tipping end of the track, thereby leaving outlet openings 36 for rollers 25. Also, and coinciding approximately with the openings 36, the channel members have fixed to the outer faces 34 thereof, ramp members 37 with which the receptacle outer rollers 32 are adapted to cooperate for facilitating the overcoming of the dead center in the carriage joint before the carriage comes to rest against stops 40.

Referring more particularly now to Figs. 3, 4, 5 and 6, it will be seen that when the receptacle 13 is in its loading position, i. e., at its lower level and in front of the vehicle as shown in Fig. 3, the carriage formed by leading section 18 and trailing section 24 is in offset condition and that the bucket will be out of contact with the channel members, except as regards the stops 35 and 35a, the bucket being supported in position by the cable 8.

In this loading position, the receptacle 13 is slightly inclined forward, with the shovel edge 38 thereof almost against the ground, so that a forward movement of the vehicle would cause said edge to dig into the material to be loaded, thereby causing a portion of said material to pass into the receptacle. In order to compensate somewhat the stress on the cable 8, a preferably adjustable tensioning means may be provided, such as a chain 39 connected between the leading section 18 and the plates 11.

Once the receptacle 13 has been loaded, the winding device 9 is started, thereby applying a pull on the cable 8 which will be transmitted to the pin 10. Since the receptacle 13 is pivoted to the free ends of the parallel side members 17 and the rollers 25, wheels 26 and 27 are within the channel members, the wings of which are continuous throughout their length with the exception of the openings 36 near the tipping end of the track, said tension will cause the receptacle to turn about the pivot pins pivoting same to the parallel side members 17, whereby the receptacle will become seated on the leading section 18, of said collapsible carriage as shown in dotted lines in Fig. 3, and at the same time the shovelling edge 38 will be raised with a movement similar to that of a shovel separating the load from the pile.

If the cable 8 is pulled further, and since the bucket 13 is seated on the leading section 18, the carriage will advance as a unit due to the application of the traction to the pulley 31 on the trailing section which due to the curvature of the rails is still deviated with respect to the parallel side members 17 but which will become aligned therewith upon reaching a straight portion of the rails (see Fig. 5, for example).

When the collapsible carriage with the receptacle approaches the high tipping end of the track, the flanged wheels 26 on leading section 18 will register with the openings 36 but will not pass therethrough due to the fact that the free ends of the parallel side members 17 are pivoted to the receptacle 13, and leading section 18 is in turn seated on trailing section 24 the rollers 25 and wheels 27 of which are still under the flanges of channel members 5.

The circumstances are different when the rollers 25 which are mounted on axle 22 constituting the central pivot of the carriage, coincide with said openings, said position being shown in Figs. 4 and 5, since, simultaneously rollers 32 mounted on the free ends of supports 33 attached to the bottom of the receptacle will contact ramp members 37 and on riding up the same will provide the necessary initial breaking of the collapsible carriage which will continue until flanged wheels of the said leading section of the collapsible carriage come to rest against stops 40 whereupon the pull of the cable 8 is applied to the closed end of the trailing section 24 and to the opposite end of the receptacle, and will draw the closed ends of the leading section and trailing section towards each other to raise or tilt the receptacle. This will cause the rollers 25 to pass through the openings 36, whereupon the carriage will collapse in a scissor like fashion, as shown in Fig. 6.

When the bucket is tilted as shown in Fig. 6, it will be securely held in such tilted position by the cable 8 and the triangle formed by the trailing section, the track and part of the frame. It will also be noted that in order to facilitate the rotary motion of the chute 15, an elongated roller 41 is provided at the end of the track.

It will be seen that in order to carry the receptacle with the contents thereof to the higher portion of the track and for tilting said receptacle, it will only be necessary to start the winding device 9 so that the transportation of the hoisted material may be carried out without having to move the vehicle on which the lift loading apparatus is mounted.

Therefore, when required a truck may be placed behind the vehicle, in longitudinal alignment, on which the material will be discharged directly, whereby the problems relating to narrow access space or lack of ground for operating the vehicle are solved.

Although the invention shown in Figures 1 through 6, performs the functions for which it is designed it has been found that occasionally the rollers constituting the release means tend to chatter between the flanges of the channel members and even sometimes display a tendency to bind and therefore the travel of the carriage is not quite as smooth as would be desired, particularly on the curved section of the track. This drawback may be overcome by the use of modified form of a releasable means illustrated in Figures 7 and 8 which has the added advantage of not requiring the cutting away of the upper flange of the channel members to provide an outlet gap for the rollers. A further advantage of the new embodiment is that the collapsible carriage rests on the track on four flanged wheels instead of six thus reducing surface friction. Also the means for initially breaking the collapsible carriage may be secured to the free ends of the leading section of the carriage instead of to the receptacle, thus simplifying the construction of the various attachments which may constitute the receptacle.

Figure 8:
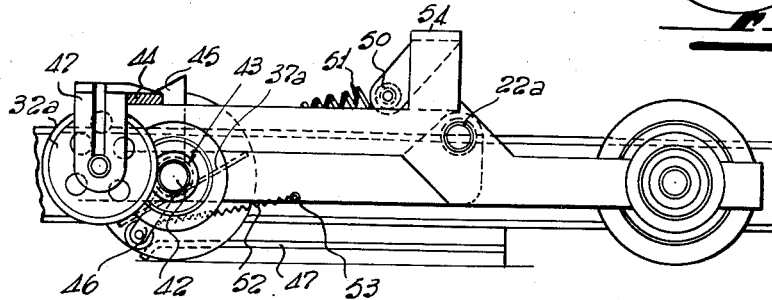
Fig. 8 is a side elevation of the modified carriage assembly illustrated in Figure 7.

Considering Figures 7 and 8 it will be seen that adjacent cross-member 24a of the trailing section of the collapsible carriage, and extending through side arms 23a thereof there is provided a common axle 42. Near the free ends of side members 17a of the leading portions of the collapsible carriage and on said axle 42 there is pivotally mounted latch means 43 capable of engaging a latch bar 44 fast on each of said side members 17a and extending from a point adjacent the free ends thereof towards the adjacent side arms 23a, each latch means 43 being provided with a latching nose 45 and a depending tail portion 46 adapted to engage a respective ramp plate 47 mounted between the channel members 5a adjacent the high tipping end of the track. Extending from a point near the free ends of side members 17a I provide a pair of depending supports 48 spaced apart cross-wise a distance greater than the spacing of the afore-mentioned channel members and having free ends in which are freely mounted rollers 32a capable of cooperating with ramp members 37a fastened on the face of each channel member 5a remote from said flange and at a point that the rollers 32a will engage ramp members 37a only after contact between the tail portion 46 of latch means 43 has contacted ramp plate 47. With the object of strengthening the trailing portion of the collapsible carriage I may provide reinforcing bars 49 extending from cross-member 24a parallel to side arms 23a to centre axle 22a, a cross receptacle support bar 54 extending between side members 17a of the leading section and secured thereto there is fast two plates 50 to which in turn there is secured the ends of two springs 51, the other ends of which are made fast to the cross member 24a of the trailing section of the collapsible carriage, this arrangement serving to assist the return of the carriage to its normal loaded position after the scissor effect has been produced and the tension of cable 8 has been released.

In a similar manner latch means 43 may be spring loaded by means of spring 52 fastened through stud 53 to side arms 23a.

Figure 9:
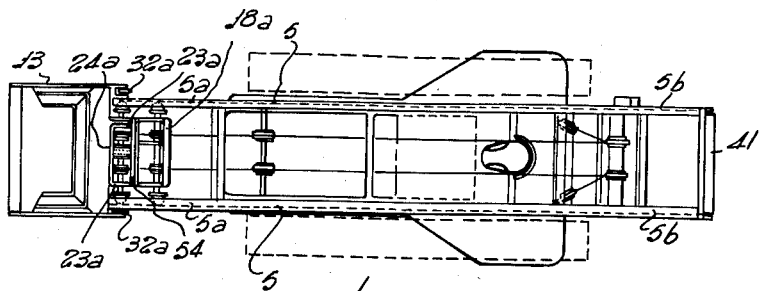
Fig. 9 is a plan view similar to that of Fig. 2 but showing the double cable with pulley arrangement.

Referring to Figure 9 it will be seen that power shovel 10 arrangement may be equipped with a double cable arrangement and in this case it will be necessary to provide twin sets of pulleys such as those indicated by the reference numeral 55.

It will be seen that as the carriage and bucket advance up the channel members towards the high tipping end of the track and before the outer rollers 32a reach the ramp members 37a the depending tail portion 46 of latch means 43 will contact the ramp plates 47 causing the latching nose 45 to disengage the latch bar 44 thus unlocking the leading section of the collapsible carriage from the trailing section thereof so that when outer rollers 32a contact ramp members 37a and commence to ride up the same, the carriage will collapse in a scissor like fashion as previously described.

It should be understood that means may be provided for discharging sideways, for example by means of a suitable guiding chute in place of the chute shown in the drawings, so that the trucks to be loaded may be placed perpendicularly with respect to the power shovel vehicle.

On the other hand, the novel structure is also adapted for other uses if the receptacle is changed for a more suitable one, for example by a platform for hoisting parcels, stacking or laying. Such substitutions do not involve changes in the general structure, since the receptacles would be similarly mounted on the carriage and therefore they would come within the scope of this invention.

It should also be understood that various changes in detail and construction may be made without departing from the scope of the invention. For example, a different cross-section may be used for the track members, such as a horizontal T-shape, and the members may be straight throughout their length, or may be in one piece or provided with openings for the collapsing of the carriage and with means for covering the openings at will. Furthermore the single cable arrangement described might be replaced by a double cable, etc.

I claim:

1. A load lifting apparatus for a vehicle comprising a frame including a pair of channel members defining a track, said channel members each having an upper flange and a lower flange, means for detachably mounting said frame on a vehicle, a collapsible carriage including a trailing section comprising a cross member and a pair of side members, wheels mounted adjacent said cross member on each side member, a wheel located between the flanges of a respective channel member, side arms pivotally connected to said side members, a receptacle pivotally connected at its rear bottom portion to said side arms, pulley means operatively connected to said carriage, a cable winding means mounted on said frame, and secured to the base of the receptacle, means operatively connected to said carriage for preventing collapse thereof while said carriage travels over said channel members, ramp means connected to said channel members, and a stop member in said frame for limiting movement of said carriage, said ramp means being so constructed as to engage said wheels on said carriage to initiate tilting thereof before said carriage engages said stop member.

2. A load lifting apparatus for a vehicle comprising a frame including a pair of channel members defining a track, said channel members each having an upper flange and a lower flange, means for detachably mounting said frame on a vehicle, a collapsible carriage including a trailing section comprising a cross member and a pair of side members, wheels mounted adjacent said cross member on each side member, a wheel located between the flanges of a respective channel member, side arms pivotally connected to said side members, a receptacle pivotally connected at its rear bottom portion to said side arms, pulley means operatively connected to said carriage, a cable winding means mounted on said frame, and secured to the base of the receptacle, means operatively connected to said carriage for preventing collapse thereof while said carriage travels over said channel members, ramp means connected to said channel members, and a stop member in said frame for limiting movement of said carriage.

3. A load lifting apparatus for a vehicle comprising a frame including a pair of channel members defining a track, said channel members each having an upper flange and a lower flange, means for detachably mounting said frame on a vehicle, a collapsible carriage including a trailing section comprising a cross member and a pair of side members, wheels mounted adjacent said cross member on each side member, a wheel located between the flanges of a respective channel member, side arms pivotally connected to said side members, a receptacle pivotally connected to said side arms, pulley means operatively connected to said carriage, a cable winding means mounted on said frame, and secured to the base of the receptacle, means operatively connected to said carriage for preventing collapse thereof while said carriage travels over said channel members, ramp means connected to said channel members, and latch means pivotally connected to said side members adjacent the free ends of said side arms.

4. A load lifting apparatus for a vehicle comprising a frame including a pair of channel members defining a track, said channel members each having an upper flange and a lower flange, means for detachably mounting said frame on a vehicle, a collapsible carriage including a trailing section comprising a cross member and a pair of side members, wheels mounted adjacent said cross member on each side member, a wheel located between the flanges of a respective channel member, side arms pivotally connected to said side members, a receptacle pivotally connected at its rear bottom portion to said side arms, pulley means operatively connected to said carriage, a cable winding means mounted on said frame, and secured to the base of the receptacle, said cable being so connected to said bucket as to exert a pushing effect thereon to tilt the same, and latching members operatively connected to said carriage for preventing collapse thereof while said carriage travels over said channel members.

5. A load lifting apparatus for a vehicle comprising a frame including a pair of channel members defining a track, said channel members each having an upper flange and a lower flange, means for detachably mounting said frame on a vehicle, a collapsible carriage including a leading section and a trailing section comprising a cross member and a pair of side members, wheels mounted adjacent said cross member on each side member, a wheel located between the flanges of a respective channel member, side arms pivotally connected to said side members, a receptacle pivotally connected at its rear bottom portion to said side arms, pulley means operatively connected to said carriage, a cable winding means mounted on said frame, and secured to the base of the receptacle, means operatively connected to said carriage for preventing collapse thereof while said carriage travels over said channel members, said trailing section being movable over said channel members, and latch means controlling the pivoted connections of said receptacle.

6. A load lifting apparatus for a vehicle comprising a frame including a pair of channel members defining a track, said channel members each having an upper flange and a lower flange, means for detachably mounting said frame on a vehicle, a collapsible carriage including a leading section and a trailing section comprising a cross member and a pair of side members, wheels mounted adjacent said cross member on each side member, a wheel located between the flanges of a respective channel member, side arms pivotally connected to said side members, a receptacle pivotally connected at its rear bottom portion to said side arms, pulley means operatively connected to said carriage, a cable winding means mounted on said frame, and secured to the base of the receptacle, means operatively connected to said carriage for preventing collapse thereof while said carriage travels over said channel members, said trailing section being movable over said channel members, latch means controlling the pivoted connections of said receptacle, and secondary latch means controlling the pivotal connections of said carriage and said channel members.

References Cited in the file of this patent

UNITED STATES PATENTS

| | | |
|---|---|---|
| 383,584 | Meyers | May 29, 1888 |
| 1,449,733 | Clausen | Mar. 27, 1923 |
| 2,130,117 | Butts | Sept. 13, 1938 |
| 2,344,246 | Grubich | Mar. 14, 1944 |
| 2,386,410 | Taggart | Oct. 9, 1945 |
| 2,392,557 | Smith et al. | Jan. 8, 1946 |
| 2,415,597 | Le Du | Feb. 11, 1947 |
| 2,468,542 | Caldwell | Apr. 26, 1949 |
| 2,655,276 | Brodeske | Oct. 13, 1953 |

FOREIGN PATENTS

| | | |
|---|---|---|
| 215,790 | Germany | Nov. 2, 1909 |
| 88,840 | Sweden | Mar. 23, 1937 |